May 26, 1970    J. J. BOUVIER    3,513,821

ABRASIVE CUT-OFF WHEEL

Filed Feb. 5, 1968

INVENTOR
JEAN J. BOUVIER

BY *Milton L. Simmons*

ATTORNEY

United States Patent Office 3,513,821
Patented May 26, 1970

3,513,821
ABRASIVE CUT-OFF WHEEL
Jean J. Bouvier, Tonawanda, N.Y., assignor to Ferro Corporation, Cleveland, Ohio, a corporation of Ohio
Filed Feb. 5, 1968, Ser. No. 702,846
Int. Cl. B24d 5/00
U.S. Cl. 125—15                         6 Claims

ABSTRACT OF THE DISCLOSURE

An abrasive wheel consisting of abrasive-carrying segments spaced around the periphery of a metallic disk in which peripheral slots extend inward between the segments, said slots filled with a yieldable, flexible web whereby objectionable noise during operation is greatly reduced and in-use peripheral distortion is minimized.

---

This invention relates to an improvement in relatively thin abrasive wheels such as are used for cutting marble or other stone or for cutting glass or for other purposes. Such wheels are commonly made by brazing small abrasive segments composed of diamond and other abrasive materials together with a bonding material around the periphery of metallic (usually steel) disks which are rotated at high speed around the axis of the disk as the abrasive is pressed against the material to be cut.

It has become common practice to separate these segments by slots in the steel which extend inward from the periphery of the disk. This serves the multiple purpose of providing a degree of flexibility to the steel whereby distortion due to heating in the brazing operation is reduced, plus acting as an aid to maintaining the disk true in use by preventing permanent distortion due to in-use, temporary deflection. The slots further provide the secondary advantage of a channel whereby the crumbled material which results from the abrasive action is removed so as not to impede further cutting.

Wheels of this type are made in various sizes depending upon their intended use but in all cases they are rotated at high peripheral speeds. For cutting glass or other relatively light ceramic materials the wheels are usually from 6 to 10 inches in diameter and from 0.05 to 0.15 inch in thickness and operating speed is from 6000 to 10,000 surface feet per minute. For cutting limestone or marble, the size is more often 16 to 32 inches in diameter and the speed up to 18,000 surface feet per minute. In such wheels the thickness of the steel disk is usually from 0.100 to 0.175 inch. The dimensions of the slots vary somewhat in proportion to the size of the wheel and the intended use of it, extending in from the periphery from ½ inch in small wheels up to 1 inch especially in larger ones. The width of the slot varies similarly from about 3/32 inch to ¼ in.

In all cases and particularly when wheel speed is 10,000 surface feet or more vibration of the wheel and entrapment of air in the slots as the wheel passes through the material being cut produces a very loud whistle or scream which is very objectionable, not only to the operator of the wheel but to others at considerable distances therefrom.

I have discovered that this objectionable noise can be eliminated without interfering with the advantages inherent in the slotted construction of the wheel by filling the slots after the wheel is otherwise completely assembled with a yieldable, flexible web as hereinafter set forth.

I had no decibel meter but was able to demonstrate my invention quantitatively as follows. I took a tape recorder which contains an electronic "eye" which appears to close as the rheostat of the device is adjusted to regulate the intensity of the signal. When my microphone was placed six inches from the edge of the cut in a characteristic case the meter on the device read one unit with open slots in the wheel when the eye became fully closed.

I then filled the slots of that wheel in accord with my invention and with everything positioned as before. I found that I had to adjust the rheostat so that the meter read five units before the eye was similarly closed. This indicates a tremendous reduction in the intensity of the noise. The difference so demonstrated was very apparent to persons in the vicinity. A very loud and objectionable scream with the open slots completely disappeared when the slots were filled.

In order that my invention may be more easily understood I describe below its application in conjunction with the appended drawings in which.

Figure 1:
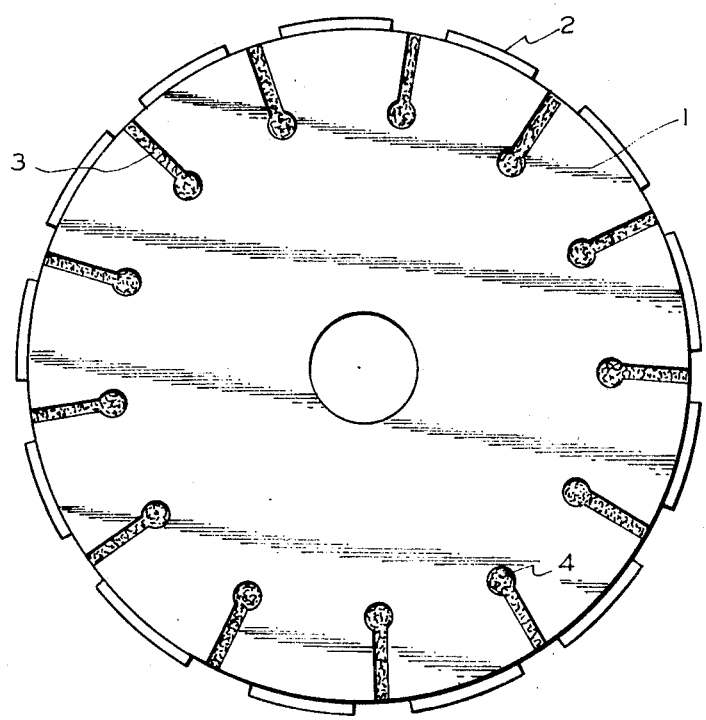
FIG. 1 shows a side view of a wheel made in accordance with my invention.
Figure 2:
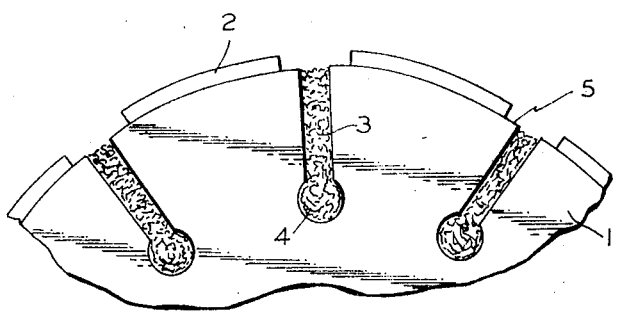
FIG. 2 shows on a larger scale the detail of a portion of the wheel represented by FIG. 1.

In these figures, the steel disk 1 comprises the main body of the wheel with an arbor hole at its center for mounting on a drive shaft. The abrasive bearing segments 2 consists of diamonds and/or other abrasive particles in a metal bond such as a mixture of sintered 75% copper and 25% tin powder which is familiar in the diamond wheel art, or other powdered metal combinations such, for example, as those disclosed in U.S. Pat. No. 2,339,270 or the segments may be made by the so-called infiltration method wherein a bond of finely divided metal powder such as bronze is hot pressed to cause it to adhere.

I first made the segments separately and then by means of induction heating braze them in proper positions around the periphery of the previously slotted disk 1. It will be noted that I have made the space between slots 3 somewhat greater than the length of adhering abrasive segments 2 which is usually about 2 inches each. This provides dimensional relief during brazing and also chip clearance during grinding. The actual overhang of shoulder 5 next to the slot may however be quite small.

Understandably, the width of the segments, with respect to the thickness of the wheel, will be somewhat greater to prevent jamming of the wheel during service, in addition to providing means for removal of abraded stock.

I have discovered that it is desirable that each slot 3 should end at its inner end in a circular space 4 which I make with a diameter of about ¼ inch or if the slot is over ⅛ inch across make the circle about twice the diameter of the slot width. These circular ends help to hold my filling 6 in place in the slot and also have proved very helpful in preventing cracks in the steel disk from developing and spreading inward from the inner ends of the slots as the wheel is in service.

To provide suitable slots in the steel disks they may be made on a metal stamping machine although I normally make them by first drilling a ring of circular holes through the disk at points corresponding to the inner ends of the slots and then either sawing or milling the slots into these holes from the periphery of the disk.

In any event when the disk is properly slotted and the abrasive segments attached I proceed with the applicant of my filler paste 6 in the slots. It is essential that the metal in and adjacent the slots be completely clean in order that the paste may adhere tightly so I rub acetone around this area with a stiff metal brush and allow it to dry before applying the paste.

The composition of my paste may vary over a wide range. The essential requirements are that after drying or curing it shall be a slightly yieldable, completely set, substantially solid material which shall adhere tightly to the steel disk throughout the abrasive service life of the wheel. It must not be so brittle as to permit it to be chipped away in use nor so soft as to be carried away by the chips from grinding. I find various resins such as the epoxys or polyesters to be extremely well suited. These may be used alone or more economically mixed with various dry powdered materials such as powdered metals, cryolite, flint, clay or even wood flour in various proportions up to 75% by volume of filler.

In a specific case which I have frequently used and recite as an example I use as my resin bond an epoxy resin sold by Reichhold Chemicals Inc. under the name Epotuf 6140. With this I mix an equal weight of their Epotuf Hardener 37–612 which is a clear, amber, low viscosity polyamide. With this combination after mixing I stir in 120 mesh atomized aluminum powder secured from Reynolds Metals to yield a stiff paste which can be pushed into the slots in the steel disk with a putty knife and smoothed off. I find that approximately equal weights of aluminum and the resin mixture work well though considerable latitude is permissible.

After allowing the material in the slots to dry and set overnight, I mount the wheel on an axle and rotate it while dressing off any unsightly adhering paste with an abrasive dresser stick. This cuts the paste surface back even with the steel face of the wheel and roughens the paste face slightly which seems to help it carry a film of water when (as usual) the wheel is used for wet cutting.

The aluminum powder gives the paste an attractive metallic appearance which is maintained throughout the life of the wheel without rusting and is relatively inexpensive but powdered copper or iron can be similarly utilized.

The epoxy resin is excellently adapted for use in that it is extremely tacky and adheres well both when applied and after curing. It also seems to have a degree of elasticity along with high strength which reduces the tendency of the steel to vibrate and cause noise thereby. Suitably catalyzed polyester resins as offered on the market are also well suited for my use in filling the slots.

Essentially, this invention consists of a metallic, slotted abrasive wheel as described above, with the peripheral slots filled with a web of material that is more flexible than the base metal of which the wheel is composed.

Having thus explained my invention and illustrated its application, I claim:

1. An abrasive cheel consisting of a metal disk carrying abrasive segments permanently fastened to the periphery thereof, said disk having slots extending inward from and open to said periphery between successive segments, said slots carrying in them an adherent, basically non-metallic, yieldable, flexible, web member comprising a resin and a dry particulate filler material, said member filling the major portion of said slot.

2. The wheel of claim 1 in which each slot terminates at its inner end in a circular enlargement at least twice as large in diameter as the width of the remainder of said slot.

3. The wheel of claim 1 in which said web member consists of cured epoxy resin having dispersed therethroughout up to 75% by volume of a dry powdered material.

4. The wheel of claim 1 in which said web member is formed from a resin selected from the group consisting of epoxy and polyester resins having dispersed therethroughout up to 75% by volume of a powdered dry filler material.

5. The wheel of claim 1 in which the abrasive segments comprise metal bonded diamond particles.

6. The wheel of claim 3 in which the dry powdered material is aluminum metal.

References Cited

UNITED STATES PATENTS 2,563,559    8/1951    Sneva.
2,990,828    7/1961    Hoerer _____ 125—15

HAROLD D. WHITEHEAD, Primary Examiner

U.S. Cl. X.R.

51—206; 143—133